United States Patent
Egner-Walter et al.

(10) Patent No.: US 10,773,689 B2
(45) Date of Patent: Sep. 15, 2020

(54) WIPER BLADE FOR THE CLEANING OF WINDOWS OF MOTOR VEHICLES

(71) Applicant: Valeo Systèmes d'Essuyage, Le Mesnil Saint Denis (FR)

(72) Inventors: Bruno Egner-Walter, Le Mesnil Saint Denis (FR); Michael Schäuble, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 15/630,329

(22) Filed: Jun. 22, 2017

(65) Prior Publication Data

US 2017/0282862 A1    Oct. 5, 2017

Related U.S. Application Data

(63) Continuation of application No. 13/976,577, filed as application No. PCT/EP2011/073318 on Dec. 20, 2011, now Pat. No. 9,751,500.

(30) Foreign Application Priority Data

Dec. 30, 2010  (DE) .......................... 10 2010 056 462

(51) Int. Cl.
*B60S 1/38*    (2006.01)

(52) U.S. Cl.
CPC .............. *B60S 1/38* (2013.01); *B60S 1/3881* (2013.01); *B60S 1/381* (2013.01); *B60S 1/3805* (2013.01); *B60S 1/3856* (2013.01); *B60S 1/3858* (2013.01); *B60S 1/3894* (2013.01); *B60S 1/3896* (2013.01)

(58) Field of Classification Search
CPC ....... B60S 1/3881; B60S 1/3882; B60S 1/381; B60S 1/3805
See application file for complete search history.

(56) References Cited

U.S. PATENT DOCUMENTS

| | | | | |
|---|---|---|---|---|
| 3,427,637 A | * | 2/1969 | Quinlan | B60S 1/3801 15/250.451 |
| 7,370,385 B2 | * | 5/2008 | Chiang | B60S 1/38 15/250.201 |

FOREIGN PATENT DOCUMENTS

| | | | | |
|---|---|---|---|---|
| WO | WO 2007142390 A1 | * | 12/2007 | ........... B60S 1/38 |
| WO | WO 2009118286 A1 | * | 10/2009 | ......... B60S 1/3805 |

OTHER PUBLICATIONS

WO2009118286A1 (machine translation), 2009.*

* cited by examiner

*Primary Examiner* — Andrew A Horton
(74) *Attorney, Agent, or Firm* — Osha Liang LLP

(57) ABSTRACT

The invention relates to a wiper blade (10) for the cleaning of windows (1) of motor vehicles, with a carrier element (15) which has a first mounting (16) for the form-fitting fastening of a wiper rubber (11) and a second mounting (22) for fastening at least one spring rail (20) serving as a support element. According to the invention, provision is made that the second mounting (22) in the longitudinal direction of the carrier element (15) forms laterally two guides (23, 24) for the spring rail (20), which embrace the lateral edge regions of the spring rail (20) in a form-fitting manner, and that the region between the guides (23, 24), viewed over the longitudinal direction of the carrier element (15), is constructed at least partially, preferably completely, as an open central zone (28).

16 Claims, 3 Drawing Sheets

WIPER BLADE FOR THE CLEANING OF WINDOWS OF MOTOR VEHICLES

Figure 1:
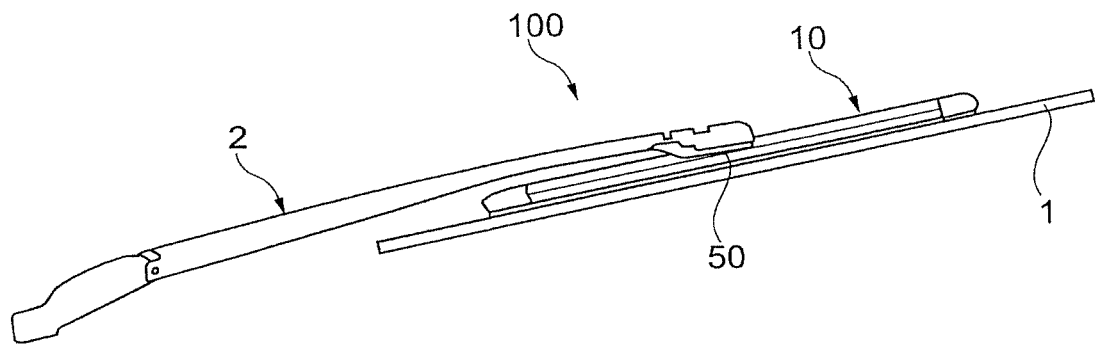

This application is a continuation application of U.S. patent application Ser. No. 13/976,577, filed on Jun. 27, 2013, which is a national stage application of PCT/EP2011/073318 filed on Dec. 20, 2011, which claims priority to DE 10 2010 056 462.1 filed on Dec. 30, 2010.

PRIOR ART

The invention relates to a wiper blade for the cleaning of windows of motor vehicles according to the introductory clause of claim 1.

Such a wiper blade is known from DE 21 2007 000 044 U1. The known wiper blade has a carrier element in the form of a profile rail which serves to receive a wiper blade, consisting of rubber, and two spring rails which are pushed in lateral slits of the carrier element. Here, the spring rails, owing to their relatively small thickness and relatively large width have a high rigidity in the respective wiping direction, and at the same time permit an adaptation of the wiper blade to the curved shape of the vehicle window. In order in particular to always enable a good abutment between the wiper rubber, in particular the wiper lip, and the vehicle window, the mentioned deformability of the wiper blade is of critical importance here. It has been found, however, that such carrier elements of wiper blades, known from the prior art, are constructed in a relatively flexurally rigid manner.

Furthermore, heatable wiper blades are known from the prior art, in which a heating arrangement is constructed in the form of a heating foil which is connected with a spring rail, in particular is glued thereon. In the construction of the carrier element known from DE 21 2007 000 044 U1, a mounting of such a heatable spring rail is, however, highly problematic, because the heating foil, which is arranged in particular on the upper side of the spring rail, could come in contact with the mounting for the spring rail, which extends up to the middle of the respective spring rail, and could therefore lead to damage or respectively premature damage to the heating arrangement.

DISCLOSURE OF THE INVENTION

Proceeding from the represented prior art, the invention is based on the problem of further developing a wiper blade for the cleaning of windows of motor vehicles according to the introductory clause of claim 1 such that it has a particularly high degree of flexibility for adapting to the curved windows of motor vehicles and enables a problem-free mounting of spring rails. This problem is solved in a wiper blade for the cleaning of windows of motor vehicles with the features of claim 1. The invention is based here on the idea of constructing the carrier element with two lateral guides which embrace the spring rail in a form-fitting manner at the lateral edge regions thereof, wherein the region between the guides, viewed over the longitudinal direction of the carrier element, is constructed at least partially, preferably completely, as an open central zone. Thereby in particular in a wiper blade using a single spring rail a secure hold of the spring rail in the carrier element is made possible, wherein at the same time the central zone which is left free enables the possibility of arranging a heating arrangement.

Advantageous further developments of the wiper blade according to the invention for the cleaning of windows of motor vehicles are indicated in the sub-claims. All combinations of at least two of the features disclosed in the claims, in the description and/or in the figures fall within the framework of the invention.

An embodiment of the invention is quite particularly preferred in which at least one, preferably both guides of the carrier element have weakened zones to reduce the flexural rigidity in the longitudinal direction of the carrier element. In particular here through the respectively specific construction of the weakened zones, particular flexural rigidities can be achieved in a targeted manner, so that the wiper blade can be adapted optimally to the respective case of application.

A simple possibility for realizing such weakened zones consists in the weakened zones being constructed as clearances arranged in particular at uniform distances from each other. Such clearances can also be taken into consideration, in particular when the carrier element is constructed as a plastic injection moulded part, already during the injection process of the carrier element, so that they are able to be produced almost with no costs involved.

Quite particularly preferred is an embodiment of the wiper blade in which the spring rail has a heating element in the form of a strip-shaped heating foil on the side facing away from the wiper rubber, wherein the heating foil is arranged within the open middle zone and, with respect to the longitudinal direction of the heating element extends laterally as a maximum up to the edge regions of the spring rail embraced by the lateral guides. With such an embodiment, in particular a damage to the heating arrangement or respectively to the heating foil on mounting of the spring rail in the carrier element is reliably avoided, because the heating foil can not come in contact with the carrier element.

In order to cover the carrier element and in particular in the presence of a heating arrangement also the heating foil, in order to thereby avoid in particular mechanical damage to the heating arrangement or respectively in the case of a spring rail, to make the access of moisture difficult, it is furthermore proposed that the carrier element has in the longitudinal direction at least one, preferably two formed webs which are embraced by guides of a covering element, wherein the covering element covers the carrier element in the mounting region of the spring rail.

Furthermore, such a covering also offers the advantage that reflections occurring owing to the metallic surface of the spring rail can not arise, and hence also can not become a safety risk for the driver when driving the vehicle.

With the use of such a covering element for the avoidance of damage or respectively contact with the heating foil, it is particularly advantageous if a free space is formed between the upper side of the spring rail and the underside of the covering element facing it. The heating foil can be arranged here in this free space, wherein between the upper side of the heating foil and the covering element of course likewise a corresponding free space is to be formed.

Such a covering element can serve furthermore to increase the contact pressure of the wiper blade, in particular at higher speeds, when the upper side of the covering element forms a spoiler element.

The fastening of the wiper blade on a wiper arm preferably takes place by means of an adapter element, which is in turn connected with the carrier element.

Here, a particularly compact and easy to install structure of the adapter or respectively wiper blade is made possible when the adapter has two holding regions in web form, projecting in the direction of the wiper rubber, wherein the guides have clearances in the region of the adapter, in which the holding regions are arranged, and wherein the holding regions cooperate in a form-fitting manner with the sections of the covering element embracing the holding webs of the carrier element.

A particularly simple and favourably-priced manufacture of the carrier element, in particular when the mentioned weakened zones are realized, is achieved when the carrier element is constructed as a single-piece component from plastic and is produced as an injection moulded part.

Figure 2:
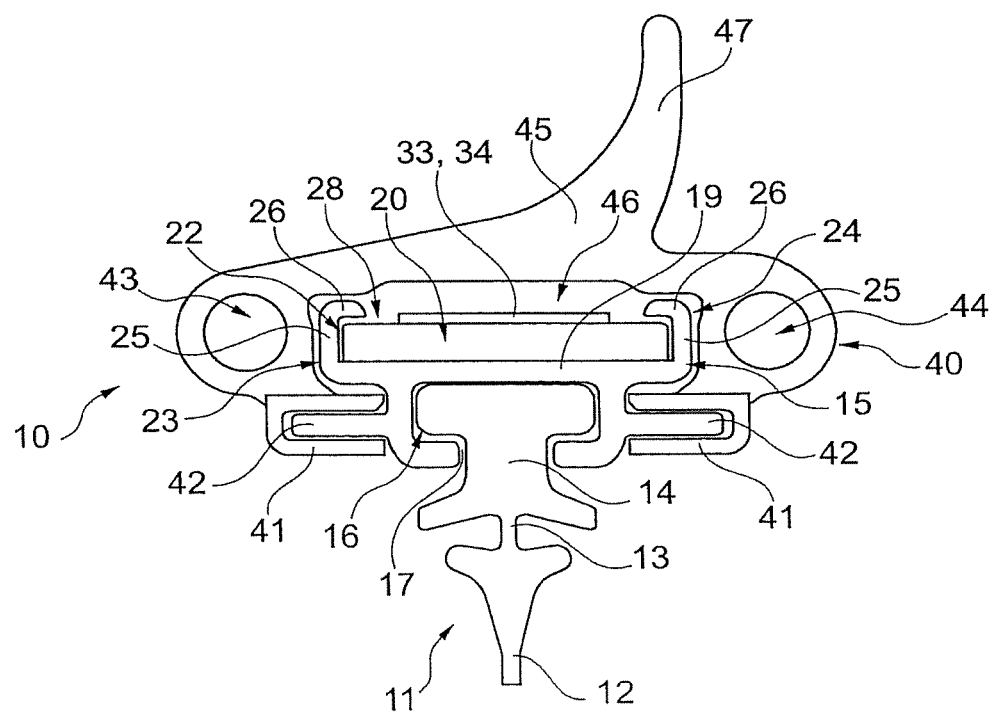
Figure 3:
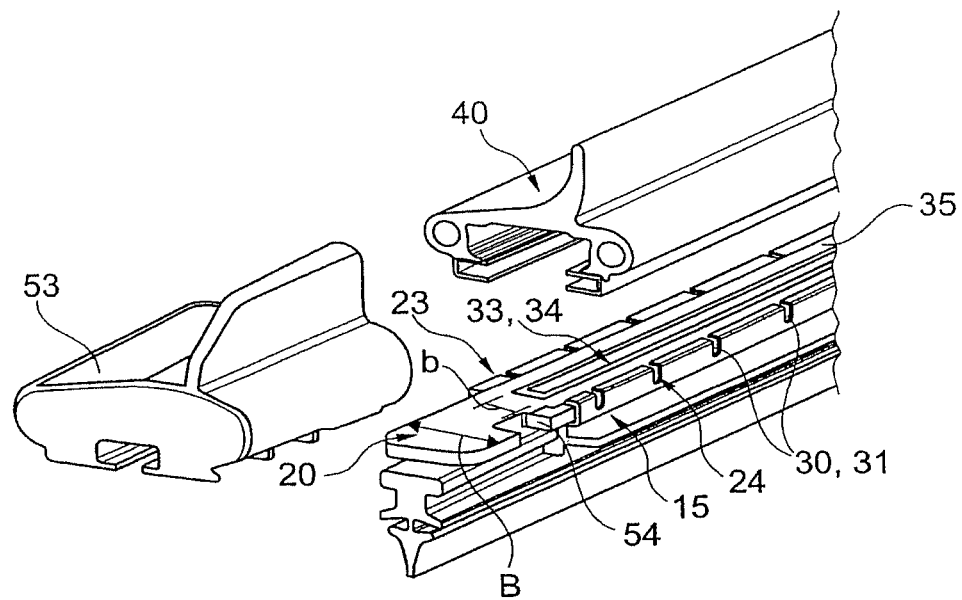
Figure 4:
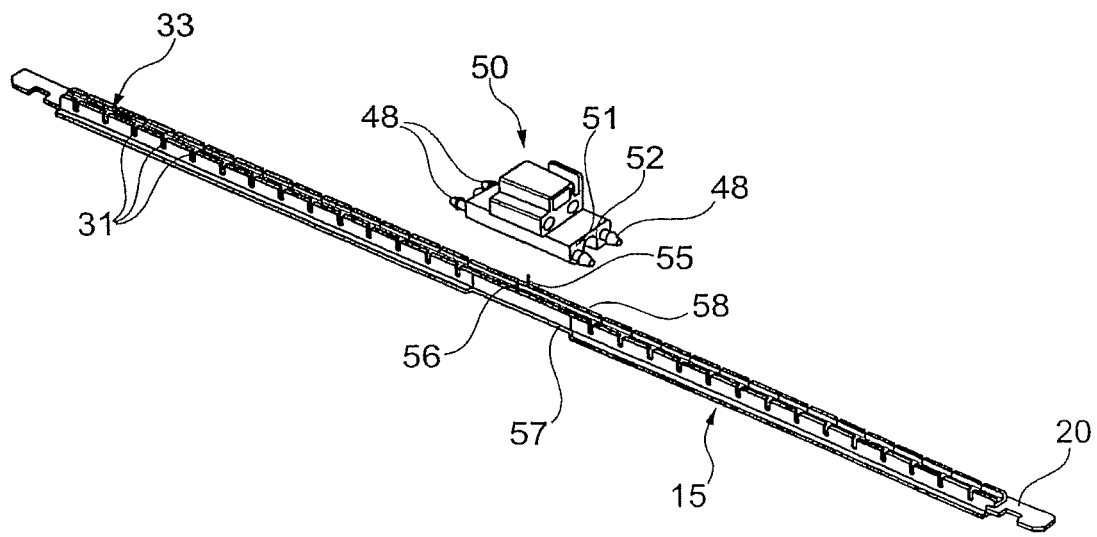
Figure 5:
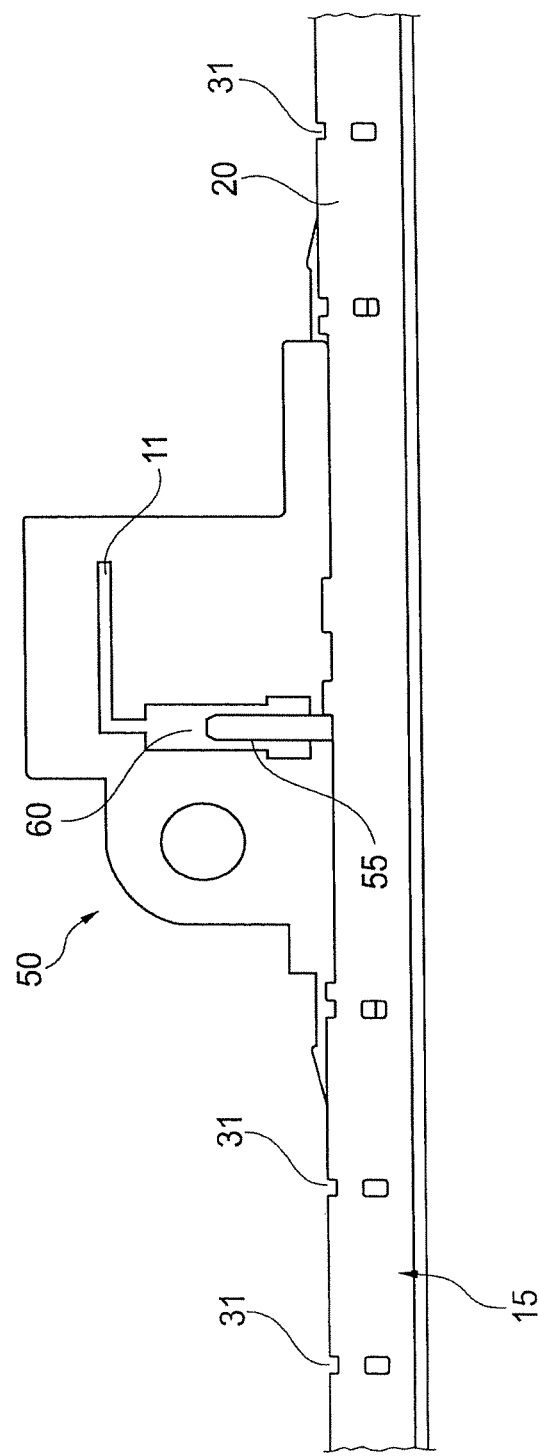

Further advantages, features and details of the invention will emerge from the following description of preferred example embodiments and with the aid of the drawings, showing in:

FIG. 1 a wiper device with a wiper blade according to the invention in perspective illustration, partially in section, FIG. 2 a cross-section through the wiper blade according to FIG. 1, FIG. 3 parts of the wiper blade according to FIG. 1 in an end region of the wiper blade in perspective view, FIG. 4 a spring element provided with a heating foil, which spring element is held in a carrier element, in connection with an adapter, in perspective view and FIG. 5 a longitudinal section in the region of the adapter to illustrate the electric connection between the heating foil and the adapter.

Identical components or respectively components having identical function are given the same reference numbers in the figures.

In FIG. 1 parts of a wiper device 100 are illustrated, which serves for the cleaning of a vehicle window 1 of a motor vehicle. The vehicle window 1 is preferably a front windscreen of the vehicle, but the invention is not intended to be restricted to wiper devices 100 for use for the cleaning of front windscreens.

The wiper device 100 has a pivotable wiper arm 2 which is driven via a motor which is not illustrated. At the one end of the wiper arm 2, the latter is connected with a wiper blade 10 according to the invention. Here, the connection between the end of the wiper arm 2 and the wiper blade 10 has an adapter element 50, arranged on the wiper blade 10, which is described in further detail later.

The wiper blade 10 has a wiper rubber 11, illustrated in further detail in particular in cross-section in FIG. 2, the wiper lip 12 of which is situated in abutting contact with the vehicle window 1. Here, the wiper lip 12 is coupled via a swivelling web 13 with a carrier section 14 of the wiper rubber 11.

The wiper rubber 11 is fastened to a carrier element 15. The carrier element 15 is produced from plastic and preferably produced or respectively constructed as an injection moulded part or by extruding. As can be seen in particular with the aid of FIG. 2, the carrier element 15 has in its longitudinal direction a continuous first mounting 16 with a likewise continuous longitudinal slit 17, so that the wiper rubber 11 in the region of its carrier section 14 can be pushed into the mounting 16 of the carrier element 15 and is received in a form-fitting manner within the mounting 16. In addition, the carrier element 15 has a horizontally aligned base section 19, on which a spring rail 20 is arranged. The spring rail 20 serves here in particular for the reinforcement of the wiper blade 10 in the respective wiping direction of the wiper blade 10, in order to avoid a deformation of the wiper blade 10.

The spring rail 20 has in particular a rectangular cross-section with a relatively small thickness and a relatively large width in relation to the thickness. The spring rail 20 is received within the carrier element 15 in a second mounting 22. The second mounting 22 is formed by the base section 19 of the carrier element 15 and two guides 23, 24 constructed in longitudinal direction of the carrier element 15. Each of the guides 23, 24 has a vertically arranged wall section 25 and a holding section 26 adjoining the wall section 25 on the side facing away from the base section 19. The holding section 26 is arranged parallel to the base section 19 and has an only relatively small width, so that the spring rail 20 is laterally embraced or respectively held by the two guides 23, 24 on the edge regions thereof. In particular, through the construction of the guides 23, 24 on the upper side of the spring rail 20 over the longitudinal direction of the spring rail 20, at least partially, preferably completely, a strip-shaped, free central region 28 or respectively a free central zone is formed.

As can be seen in particular with the aid of FIG. 3, the two guides 23, 24 have weakened zones 30, which in particular are formed as clearances in the form of slits 31, constructed in the wall sections 25 and the holding sections 26, arranged transversely to the longitudinal extent, wherein the slits 31 are preferably arranged at equally-sized distances from each other.

On the upper side of the spring rail 20 a heating arrangement 33 is arranged. The heating arrangement 33 has a strip-shaped heating foil 34, which is arranged in particular with the upper side of the spring rail 20 in contact over the entire surface, for example by an adhesive connection. A heating element 35, in particular in the form of a heating wire, is arranged in the heating foil 34. As can be seen in particular with the aid of FIG. 3, the heating foil 34 has a width b, which is smaller than the width B of the spring rail 20. Furthermore, the width b is also smaller than the distance between the two holding sections 26 of the guides 23, 24, so that with spring rail 20 pushed in in the second mounting 22, the heating foil 34 reaches maximally up to the holding sections 26, but preferably still maintains a distance therefrom, as is illustrated in FIG. 3.

For protection and also for covering the upper side of the spring rail 20 with its heating foil 34, the carrier element 15 is additionally connected with a covering element 40. The covering element 40 has two U-shaped mountings 41, which embrace in a form-fitting manner holding webs 42 extending on the carrier element 15 at the height of the first mounting 16 on both sides in longitudinal direction. The covering element 40 has at the height of the second mounting 22 two spray ducts 43, 44 extending in longitudinal direction, which serve for the supplying of washing fluid to spray openings which are not illustrated in the figures, which open out in the spray ducts 43, 44, and which spray washing fluid onto the vehicle window 1 during the washing operation. Above the spray ducts 43, 44 the covering element 40 has a substantially horizontally constructed or respectively arranged covering 45, wherein between the covering 45 and the spring rail 20, in particular also between the upper side of the heating foil 34 and the covering 45, a free space 46 is formed. In addition, the covering element 40 has on its upper side facing away from the wiper rubber 11 a spoiler element 47, which depending on the vehicle speed produces an additional contact pressure of the wiper blade 10 onto the vehicle window 1.

Both the wiper rubber 11 and also the spring rail 20 connected with the heating foil 34, and the covering element 40 by pushing on in longitudinal direction of the carrier element 15 can be connected therewith. So that in the mounted state of the components a secure interconnection is created between the components, the wiper blade 10 has at its two ends respectively a covering cap 53, which overlaps the front faces of the components and through an engagement, in particular in the region of a clearance 54 of the spring rail 20, provides for a secure interconnection of the components.

The heating foil 34 is electrically contacted by means of two connecting pins 55, 56, illustrated in FIGS. 4 and 5, wherein the connecting pins 55, 56 in the example embodiment project perpendicularly from the spring rail 20. The contacting of the connecting pins 55, 56 takes place by means of the adapter element 50 illustrated in further detail in FIGS. 4 and 5. Here, the adapter element 50, as can be seen in particular with the aid of FIG. 5, has respectively a plug connection 60 for each of the two connecting pins 55, 56, wherein the plug connection 60 is constructed so that it receives the connecting pin 55, 56 in a form-fitting manner on perpendicular bringing together. Furthermore, in FIG. 4 connecting pieces 48 can also be seen for the supplying of the washing fluid into the spray ducts 43, 44.

The adapter element 50 has holding regions, arranged beneath the connecting pieces 48 in longitudinal direction of the adapter element 50, in the form of guides 51, 52 which likewise cooperate with the covering element 40, which is constructed divided into two, so that it reaches with one front face respectively up to the adapter element 50. So that the guides 51, 52 can be arranged into the region of the U-shaped mountings 41, the carrier element 15 has in the region of the adapter element 50 clearances 57, 58, in which no first mountings 16 or respectively no holding webs 42 are constructed.

The wiper device 100 described so far or respectively the wiper blade 10 can be altered or respectively modified in a variety of ways without departing from the idea of the invention. This consists in the construction of a first mounting 16 to receive a spring rail 20, wherein the first mounting 16 comprises lateral guides 23, 24, so that in particular a heating foil 34, connected with the spring rail 20, can be connected with the carrier element 15 without the risk of damage or premature damage. Thus it is conceivable, for example, to dispense with the mentioned spray ducts 43, 44. In addition, the covering element 40 can also be shaped or respectively constructed differently.

LIST OF REFERENCE NUMBERS 1 vehicle window
2 wiper arm
10 wiper blade
11 wiper rubber
12 wiper lip
13 swivelling web
14 carrier section
15 carrier element
16 first mounting
17 longitudinal slit
19 base section
20 spring rail
22 second mounting
23 guide
24 guide
25 wall section
26 holding section
28 free central zone
30 weakened zone
31 slit
33 heating arrangement
34 heating foil
35 heating element
40 covering element
41 U-shaped mounting
42 holding webs
43 spray duct
44 spray duct
45 covering
46 free space
47 spoiler element
48 connecting piece
50 adapter element
51 guide
52 guide
53 covering cap
54 clearance
55 connecting pin
56 connecting pin
57 clearance
58 clearance
60 plug connection
100 wiper device
b width of the heating foil
B width of the spring rail

The invention claimed is:

1. A wiper blade for the cleaning of windows of motor vehicles, comprising:
   a carrier element which has a first mounting for the form-fitting fastening of a wiper rubber and a second mounting for fastening at least one spring rail serving as a support element, wherein a heating arrangement in the form of a strip-shaped heating foil is directly disposed on a side of the spring rail facing-away from the wiper rubber; and
   a covering element which covers a mounting area of the spring rail,
   wherein the second mounting in a longitudinal direction of the carrier element forms laterally two guides for the spring rail, which embrace the lateral edge regions of the spring rail in a form-fitting manner,
   wherein the region between the covering element, the guides, and the at least one spring rail, viewed over the longitudinal direction of the carrier element, is constructed as an open central zone,
   wherein the wiper rubber is form-fitted to the first mounting and the at least one spring rail is fastened to the second mounting, and
   wherein the heating foil does not contact any part of the carrier element.

2. The wiper blade according to claim 1, wherein both guides of the carrier element have weakened zones to reduce the flexural rigidity in the longitudinal direction of the carrier element.

3. The wiper blade according to claim 2, wherein the weakened zones are constructed as clearances arranged in particular at uniform distances from each other.

4. The wiper blade according to claim 1, wherein the heating foil is arranged within the open central zone and, with respect to a longitudinal direction of the heating foil, extends laterally as a maximum up to the edge regions of the spring rail embraced by the lateral guides.

5. The wiper blade according to claim 1, wherein the carrier element has in the longitudinal direction two formed webs, which are embraced by guides of the covering element.

6. The wiper blade according to claim 5, wherein a free space is formed between the upper side of the spring rail and the underside of the covering element facing it.

7. The wiper blade according to claim 5, wherein the upper side of the covering element forms a spoiler element.

8. The wiper blade according to claim 5, wherein the carrier element is coupled with an adapter element for fastening the wiper blade on a wiper arm.

9. The wiper blade according to claim 8, wherein the adapter has two holding regions in web form, projecting in the direction of the wiper rubber, wherein the guides have clearances in the region of the carrier element, in which the holding regions are arranged, and wherein the holding regions cooperate in a form-fitting manner with the mountings of the covering element embracing the holding webs of the carrier element.

10. The wiper blade according to claim 1, wherein the carrier element is constructed as a single-piece component made from plastic, and is produced as an injection moulded part or by extrusion.

11. The wiper blade according to claim 1, wherein both guides of the carrier element are constructed to have weakened zones to reduce the flexural rigidity in the longitudinal direction of the carrier element.

12. The wiper blade according to claim 1, wherein a portion of the carrier element comprising the second mounting that forms the guides for the spring rail is U-shaped.

13. The wiper blade according to claim 1, wherein the carrier element comprises a base section wall that directly connects the two guides for the spring rail.

14. The wiper blade according to claim 13, wherein each guide comprises an upper wall and a lower wall, the upper wall defining a free end of the guide, the upper wall being substantially perpendicular to the lower wall and substantially parallel to the base wall, and the upper walls being spaced apart by an open space in a lateral direction which is perpendicular to the longitudinal direction.

15. The wiper blade according to claim 14, wherein the entirety of the guides is above the base wall and the entirety of the first mounting is below the base wall.

16. The wiper blade according to claim 1, wherein the covering element, at a height of the second mounting, includes a spray duct extending in a longitudinal direction in each guide.

* * * * *